(12) United States Patent
Okamatsu

(10) Patent No.: US 7,693,020 B2
(45) Date of Patent: Apr. 6, 2010

(54) OPTICAL DISK DEVICE, AND FOCUSED LAYER DISCRIMINATING METHOD OF OPTICAL DISK

(75) Inventor: Kazuhiko Okamatsu, Chiba (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 11/670,119

(22) Filed: Feb. 1, 2007

(65) Prior Publication Data

US 2007/0189141 A1 Aug. 16, 2007

(30) Foreign Application Priority Data

Feb. 15, 2006 (JP) .......................... P2006-038304

(51) Int. Cl.
*G11B 7/00* (2006.01)
(52) U.S. Cl. .................... 369/53.22; 369/44.35; 369/93
(58) Field of Classification Search .................. 369/94, 369/44.25, 44.26, 53.22, 44.35, 53.1, 53.23
See application file for complete search history.

(56) References Cited

U.S. PATENT DOCUMENTS 5,559,639 A * 9/1996 Nakagishi et al. ........... 359/823

FOREIGN PATENT DOCUMENTS

JP 8-185637 7/1996

\* cited by examiner

*Primary Examiner*—Nabil Z Hindi
(74) *Attorney, Agent, or Firm*—Oblon, Spivak, McClelland, Maier & Neustadt, L.L.P.

(57) ABSTRACT

An optical disk device includes: an objective lens for focusing an optical beam on a recording layer of an optical disk; a converging lens for converging the reflected optical beam reflected on the recording layer; first and second light receiving units disposed at positions spaced ahead and behind at equal distances from the focal point of the reflected optical beam converged by the converging lens; and a focused recording layer discriminating unit for deciding, on the basis of the output signal of the first light receiving unit and the output signal of the second light receiving unit, the positional relation in a two-layer optical disk between a focused recording layer, on which the optical beam is focused, and a defocused recording layer, on which the optical beam is not focused, thereby to discriminate the focused recording layer on the basis of the decision result.

3 Claims, 9 Drawing Sheets

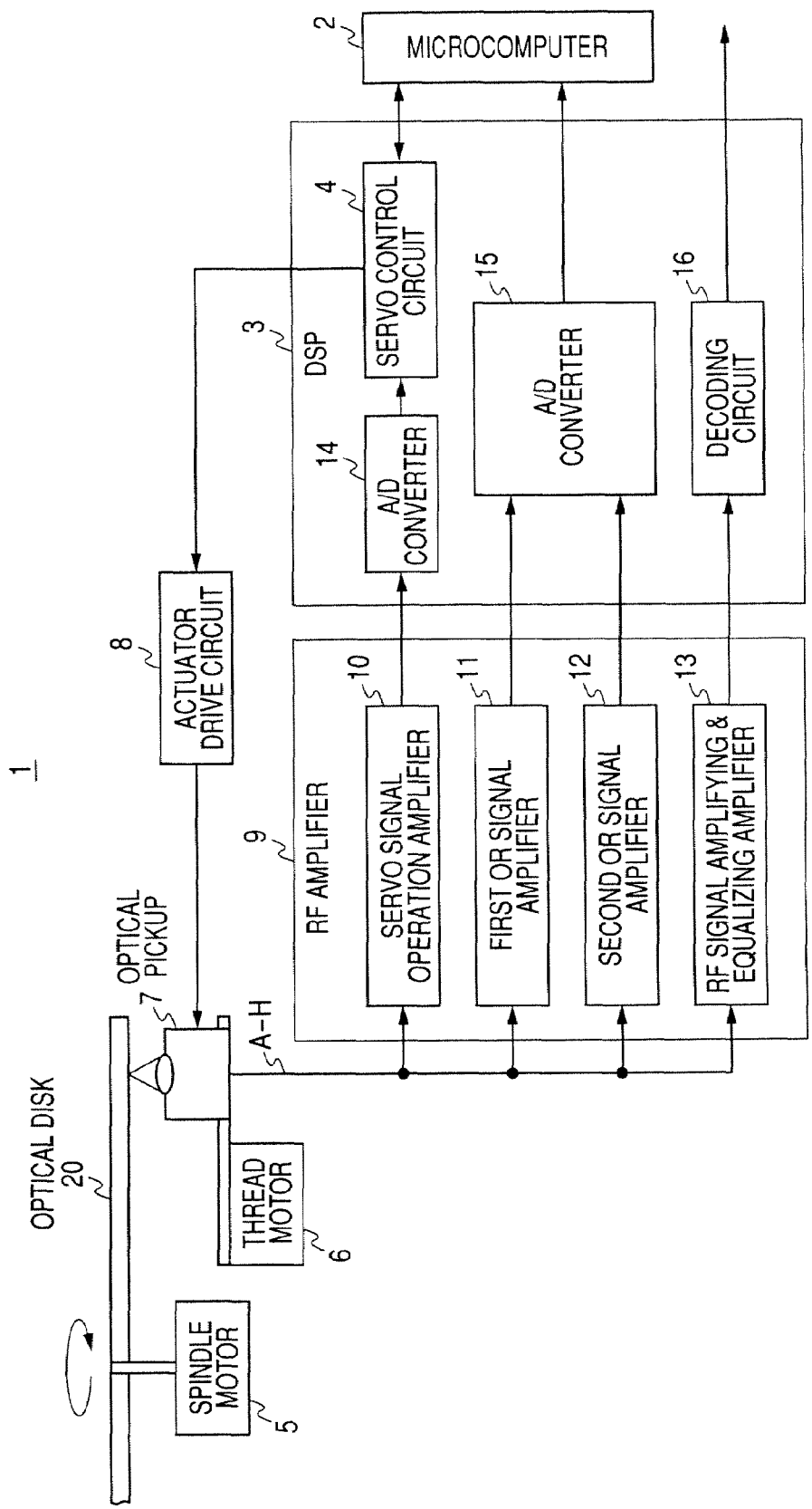

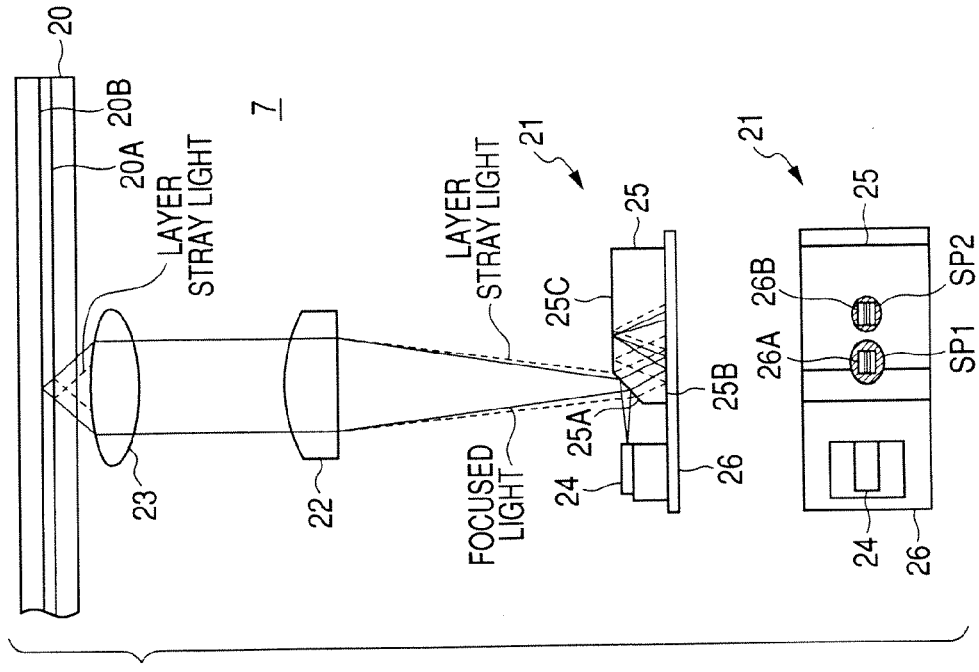
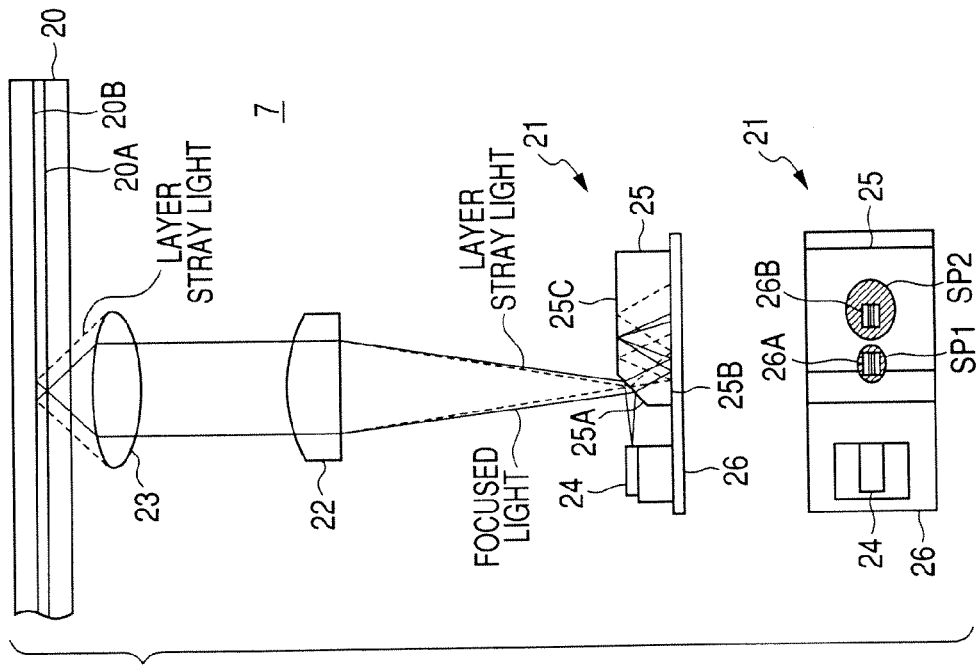

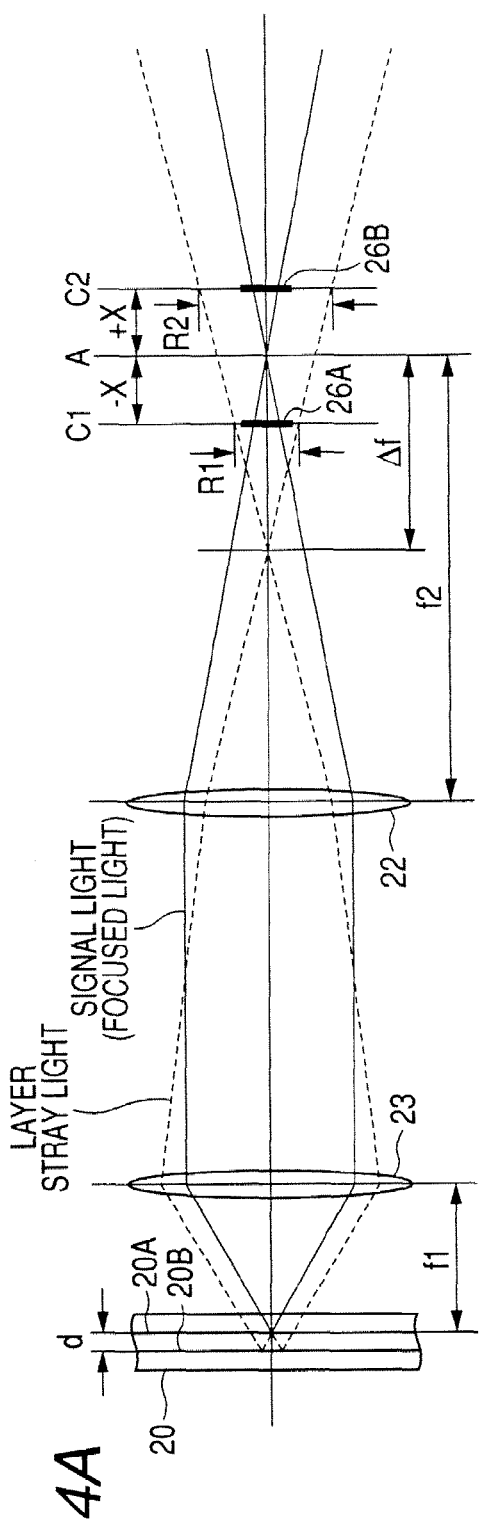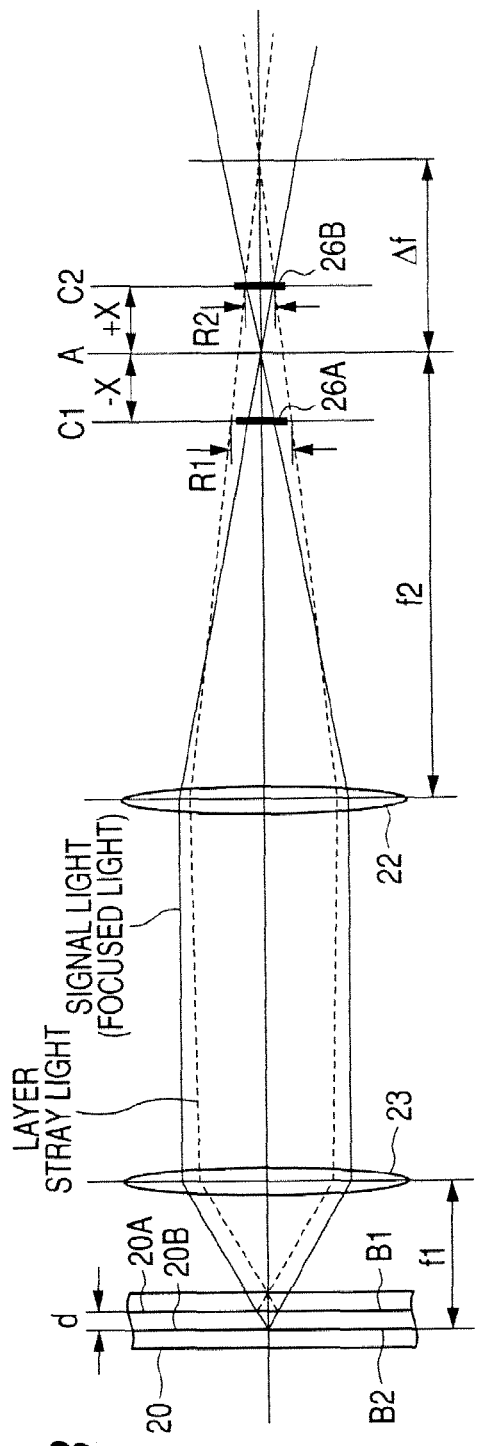
FIG. 4A
FIG. 4B

SIGNAL LIGHT SPOT

STRAY LIGHT SPOT
AT FOCUSING TIME
OF SHALLOW-SIDE
RECORDING LAYER

STRAY LIGHT SPOT
AT FOCUSING TIME
OF DEEP-SIDE
RECORDING LAYER

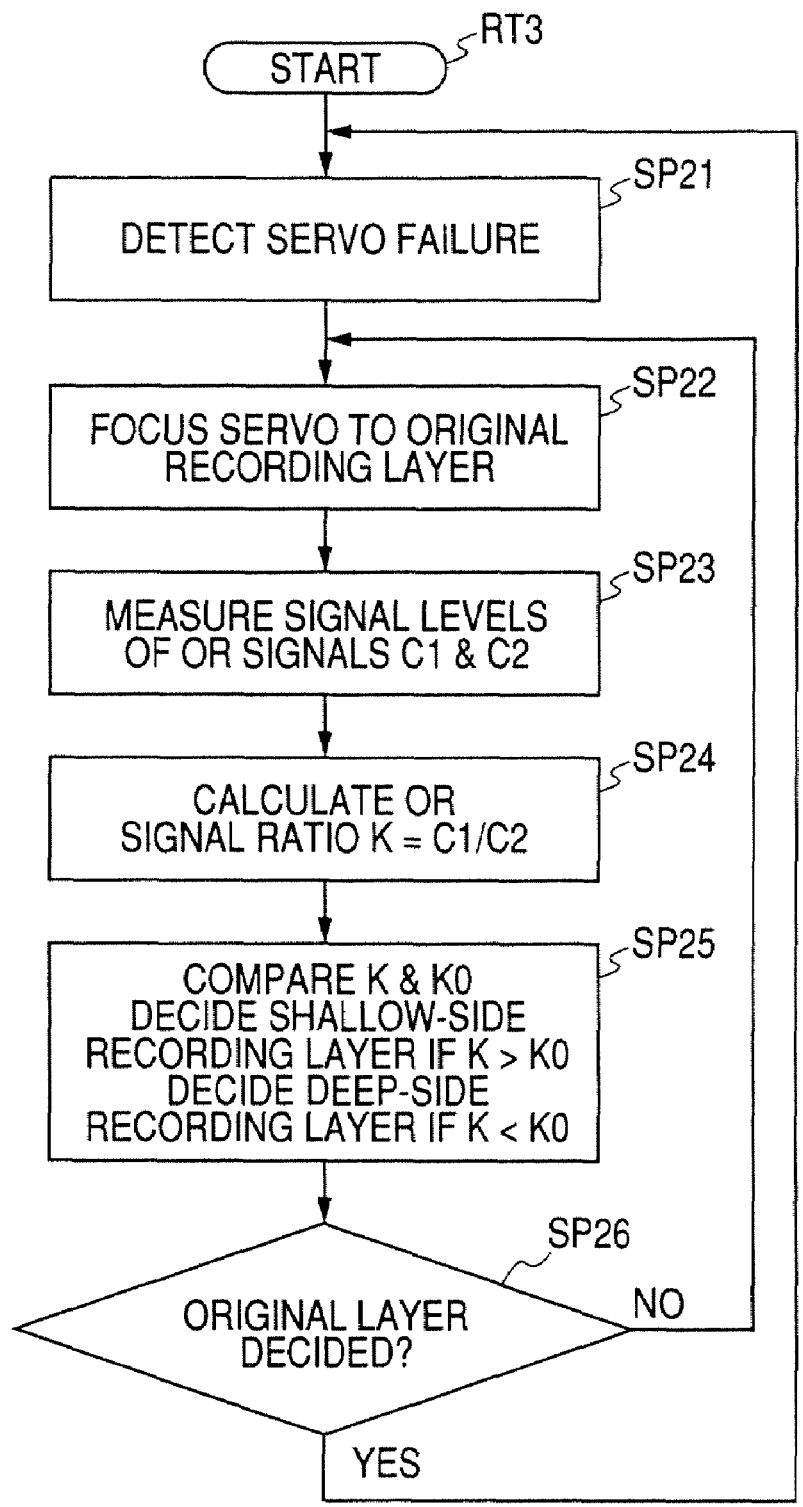

OPTICAL DISK DEVICE, AND FOCUSED LAYER DISCRIMINATING METHOD OF OPTICAL DISK

CROSS REFERENCES TO RELATED APPLICATIONS

The present invention contains subject matter related to Japanese Patent Application JP 2006-038304 filed in the Japanese Patent Office on Feb. 15, 2006, the entire contents of which being incorporated herein by reference.

BACKGROUND OF THE INVENTION

1. Field of the Invention

The invention is properly applied to an optical disk device matching a two-layer optical disk having two recording layers.

2. Background Art

In the related art, an optical disk having two recording layers laminated (as will be called the "two-layer optical disk") with a view to augmenting a recording capacity is put into practice, and an optical disk device suited for that two-layer optical disk is also commercially available.

In this optical disk device suited for the two-layer optical disk, it is necessary to discriminate which of two recording layers an optical beam emitted from an optical pickup is focused on. For this focused layer discriminating method, there has been proposed (as referred to JP-A-8-185637 (Patent Document 1), for example) an optical disk device, in which address information of data and layer information, as recorded in the recording layers, are read out through an optical beam so that the focused layer discrimination is performed on the basis of the address information and the layer information read out.

SUMMARY OF THE INVENTION

In the optical disk device thus constituted, however, the address information and the layer information may not be read out before a tracking servo is pulled in. In case, however, the tracking servo fails because an impact is applied to the optical disk device, the focused layer may not be discriminated till the servo pull-in is completed again. This raises a problem that it takes time to discriminate the focused layer.

In view of the above, it is therefore desired to propose an optical disk device capable of discriminating a focused layer in a two-layer optical disk promptly with a simple constitution, and a method for discriminating the focused layer of the optical disk.

According to a first embodiment of the invention, there is provided an optical disk device including: an objective lens for focusing an optical beam on a recording layer of an optical disk; a converging lens for converging the reflected optical beam reflected on the recording layer; first and second light receiving units disposed at positions spaced ahead and behind at equal distances from the focal point of the reflected optical beam converged by the converging lens; and a focused recording layer discriminating unit for deciding, on the basis of the output signal of the first light receiving unit and the output signal of the second light receiving unit, the positional relation in a two-layer optical disk between a focused recording layer, on which the optical beam is focused, and a defocused recording layer, on which the optical beam is not focused, thereby to discriminate the focused recording layer on the basis of the decision result.

According to this first embodiment, moreover, the focused recording layer discriminating unit may recognize, on the basis of the comparison between the signal level ratio between the output signal of the first light receiving unit and the output signal of the second light receiving unit as calculated by using a reference single-layer optical disk, and the signal level ratio between the output signal of the first light receiving unit and the output signal of the second light receiving unit as calculated using a two-layer optical disk whose focused layer is to be discriminated, the relation between the light quantities, in which a stray light produced from the optical beam reflected on the defocused recording layer enters the first and second light receiving units, thereby to discriminate the focused recording layer on the basis of the light quantity relation recognized.

As a result, this optical disk device can discriminate the focused recording layer at the instant when the optical beam is focused on the recording layer so that it can discriminate the focused layer more rapidly than the related art.

According to the embodiment of the invention, on the basis of the output signal of the first light receiving unit and the output signal of the second light receiving unit, the positional relation in a two-layer optical disk between a focused recording layer, on which the optical beam is focused, and a defocused recording layer, on which the optical beam is not focused, is decided to discriminate the focused recording layer on the basis of the decision result. At the instant when the optical beam is focused on the recording layer, the focused recording layer can be discriminated. Thus, it is possible to realize an optical disk device and a method for discriminating the focused layer of the optical disk, which can discriminate the focused layer more rapidly than the related art.

BRIEF DESCRIPTION OF THE DRAWINGS

FIG. 1 is a block diagram showing the entire configuration of an optical disk device;

FIGS. 3A and 3B present schematic diagrams provided for explaining a layer stray light in an optically integrated element;

FIGS. 4A and 4B present schematic diagrams showing an optical system principle of the optical pickup;

FIG. 9 is a flow chart of a servo recovering procedure.

DESCRIPTION OF THE PREFERRED EMBODIMENT

Figure 2A:
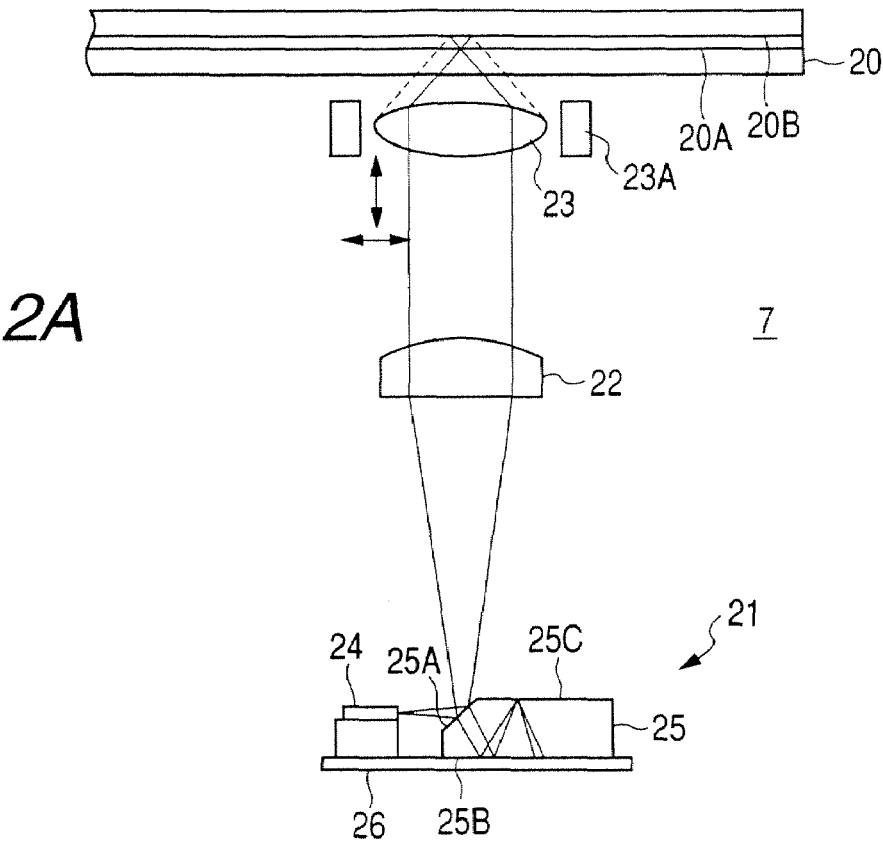
FIGS. 2A to 2C present schematic diagrams showing the constitution of an optical pickup.

One embodiment of the invention is described in detail in the following with reference to the accompanying drawings.

Embodiment (1) Entire Configuration of Optical Disk Device

In FIG. 1, reference numeral 1 designates an optical disk device according to an embodiment of the invention. A microcomputer 2 is constituted to control the individual units of the optical disk device 1 in accordance with the basic program and the application program, which are stored in a nonvolatile memory (although not shown).

Specifically, the microcomputer 2 activates a spindle motor 5 through a servo control circuit 4 of a DSP (Digital Signal Processor) 3 to rotate thereby to drive an optical disk 20 placed on a turntable (although not shown) Moreover, the microcomputer 2 activates a thread motor 6 through the servo control circuit 4 to rotate thereby to move an optical pickup 7 in the radial direction of the optical disk 20.

FIG. 2A shows a constitution of the optical pickup 7 including an integrated optical element 21, a collimator lens 22 and an objective lens 23. This integrated optical element 21 is constituted to include a laser diode 24, a micro prison 25 and a PDIC (Photo Detector IC) 26.

According to the control of the microcomputer 2 (FIG. 1), the laser diode 24 of the integrated optical element 21 emits the optical beam of a laser light so that the optical beam may enter a first reflecting surface 25A of the micro prism 25. This first reflecting surface 25A is made of a half mirror, which reflects the optical beam from the laser diode 24 upward by 90 degrees, into the collimator lens 22. This collimator lens 22 converts the optical beam from a divergent light into a parallel light thereby to introduce the parallel light into the objective lens 23.

The objective lens 23 is movably supported by a biaxial actuator 23A. In response to an instruction from a microcomputer 2 and various signals from an RF amplifier 9, the servo control circuit 4 (FIG. 1) of the DSP 3 generates and feeds a tracking servo signal and a focus servo signal to an actuator drive circuit 8. In response to the tracking servo signal and the focus servo signal, moreover, the actuator drive circuit 8 generates and feeds a tracking servo drive current and a focus drive current to the biaxial actuator 23A so that the objective lens 23 is driven in a focusing direction and in a tracking direction thereby to align the focal point of the objective lens 23 with the track on the recording surface of the optical disk 20.

Moreover, the objective lens 23 converges and focuses the optical beam from the collimator lens 22, on a recording layer of the optical disk 20, and receives and introduces the optical beam reflected on that recording layer, into the collimator lens 22. This collimator lens 22 converts the reflected optical beam from the parallel light into a converged beam, and introduces the converged beam into the reflecting surface 25A of the micro prism 25.

The first reflecting surface 25A transmits and reflects the reflected optical beam, and introduces the reflected optical beam into a second reflecting surface 25B disposed on the lower face of the micro prism 25.

Figure 2B:
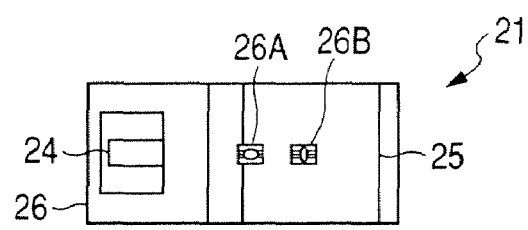
Figure 2C:
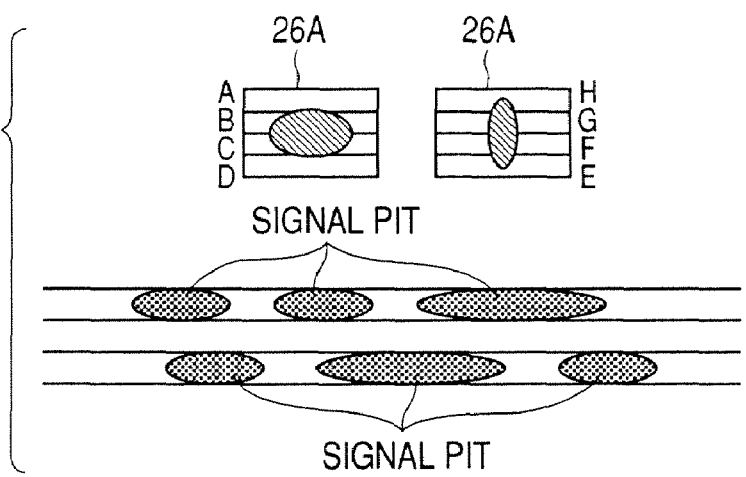

This second reflecting surface 25B is made of a half mirror having a transmission of 50% and a reflection of 50%. Thus, the second reflecting surface 25B transmits 50% of the reflected optical beam, and irradiates a first photo diode 26A (FIG. 2B) disposed at a position to confront the second reflecting surface 25B at the upper face of the PDIC 26, with the transmitted optical beam. At the same time, the second reflecting surface 25B reflects and introduces the remaining 50% of the reflected optical beam into a third reflecting surface 25C formed on the upper face of the micro prism 25.

The third reflecting surface 25C is made of a total reflection mirror. This third reflecting surface 25C reflects the incoming reflected optical beam totally, and irradiates a second photo diode 26B (FIG. 2B) disposed on the upper face of the PDIC 26, with the totally reflected optical beam.

The first photo diode 26A and the second photo diode 26B are disposed at the positions which are spaced back and forth by equal distances from the focal plane of the reflected optical beam of the optical beam focused on the recording layer. As a result, the spots of the reflected optical beams incident on the first photo diode 26A and the second photo diode 26B have diameters according to the disposed distances of the first photo diode 26A and the second photo diode 26B.

As shown in FIG. 3A, the light receiving surfaces of the first photo diode 26A and the second photo diode 26B are divided into four light receiving surfaces A to D and light receiving surfaces E to H, respectively. Moreover, the PDIC 26 generates light receiving signals A to H according to the received light quantities of the individual light receiving surfaces A to H, and feeds them to the RF amplifier 9 (FIG. 1).

An RF signal amplifying & equalizing amplifier 13 of the RF amplifier 9 synthesizes and amplifies the light receiving signals A to H thereby to generate reproduced signals. Moreover, a decoding circuit 16 of the DSP 3 decodes the reproduced signals thereby to restore and output the recorded data recorded in the optical disk 20.

Moreover, a servo signal operation amplifier 10 of the RF amplifier 9 generates tracking error signals and focus error signals from the light receiving signals A to H. These signals are digitally converted by an A/D converter 15 of the DSP 3, and are fed to the servo control circuit 4. On the basis of the tracking error signals and the focus error signals, moreover, the servo control circuit 4 generates tracking servo signals and focus servo signals thereby to perform the focusing control and the tracking control of the objective lens 23.

(2) Focal Layer Discriminating Method of Optical Disk According to Embodiment of the Invention A focal layer discriminating method in the optical disk device 1 is described in the following. The aforementioned servo signal operation amplifier 10 generates the focus error signals by using the spot size detecting method, in which a focus error is acquired by detecting the fluctuations of two spot sizes ahead and behind the focal position of the reflected optical beam incident on the micro prism 25, with the first photo diode 26A and the second photo diode 26B.

In case a two-layer optical disk is reproduced by the optical disk device 1 having the optical pickup 7 thus constituted, a layer stray light, as produced from an optical beam by a recording layer defocusing that optical beam, is also incident on the PDIC 26.

FIG. 3A shows the irradiated state with the layer stray light by a deep-side recording layer 20B or the defocused recording layer in the state where the optical beam is focused on a shallow-side recording layer 20A of the two-layer optical disk 20. The first and second photo diodes 26A and 26B are irradiated with a first stray light spot SP1 and a second stray light spot SP2, respectively.

On the other hand, FIG. 3B shows the irradiated state with the layer stray light by the shallow-side recording layer 20A or the defocused recording layer in the state where the optical beam is focused on the deep-side recording layer 20B of the two-layer optical disk 20. In this case, too, the first and second photo diodes 26A and 26B are irradiated with a first stray light spot SP1 and a second stray light spot SP2, respectively.

This layer stray light is not focused on the optical disk 20 so that it is hardly modulated by the signal component recorded on the optical disk 20. As a result, both the first stray light spot SP1 and the second stray light spot SP2 can be deemed as a DC offset light containing no modulated component.

Here, the quantity of the layer stray light to enter the first photo diode 26A varies with the light receiving area of the first photo diode 26A and the spot diameter of the first stray light spot SP1. Likewise, the quantity of the layer stray light to enter the second photo diode 26B varies with the light receiving area of the second photo diode 26B and the spot diameter of the second stray light spot SP2.

Specifically, as the spot diameter of the stray light spot becomes the larger than the light receiving area of the photo diode, the DC offset of the OR signals (A+B+C+D and E+F+G+H) of the photo diodes becomes the smaller. As the spot diameter of the stray light spot becomes the smaller than the light receiving area of the photo diode, the DC offset of the OR signals becomes the larger.

The spot diameter of the stray light spot is determined by the optical magnification of the optical pickup 7, the numerical aperture NA of the objective lens 23, the positions of the two photo diodes on the optical axis, and the interlayer thickness d of the optical disk 20. Generally, the light receiving area of the photo diode is desired to be as small as possible, because the optical beam is designed premising that the optical beam is focused on the recording layer, and because the interference of the layer stray light on the signal is as little as possible. Therefore, it is usual that the spot diameter of the stray light spot is larger than the receiving surface of the photo diode.

This principle is described with reference to the optical system principle diagram of the optical pickup 7 shown in FIGS. 4A and 4B. FIG. 4A shows the state, in which the optical beam is focused on the shallow-side recording layer 20A of the optical disk 20. Specifically, the optical beam, as focused by the objective lens 23 having a focal distance f1 and the numerical aperture NA, is focused and reflected on the shallow-side recording layer 20A. This reflected optical beam is received into a parallel light by the objective lens 23, and is converged by the collimator lens 22 having a focal distance f2. This focused light is incident as the signal on the first photo diode 26A and the second photo diode 26B.

Simultaneously with this, a portion of the optical beam, which is converged by the objective lens 23 and irradiates the optical disk 20, is reflected into the layer stray light by the deep-side recording layer 20B positioned deeply by the interlayer thickness d from the shallow-side recording layer 20A, so that the layer straight light enters the first photo diode 26A and the second photo diode 26B through the objective lens 23 and the collimator lens 22. Thus, the two optical beams (i.e., the focused light and the layer stray light) having a focal distance difference $\Delta f$ enter the first photo diode 26A and the second photo diode 26B.

In this state, the stray light spot, with which the second photo diode 26B is irradiated, is larger than the stray light spot, with which the first photo diode 26A is irradiated.

On the other hand, FIG. 4B shows the state, in which the optical beam is focused on the deep-side recording layer 20B of the optical disk 20. The optical beam, as focused by the objective lens 23, is focused on the deep-side recording layer 20B, and is reflected by the same deep-side recording layer 20B. This reflected optical beam is received into a parallel light by the objective lens 23, and is then converged by the collimator lens 22. This focused light is incident as the signal light on the first photo diode 26A and the second photo diode 26B.

Simultaneously with this, a portion of the optical beam, with which the optical disk 20 is irradiated, is reflected into the layer stray light by the shallow-side recording layer 20A positioned by the interlayer thickness d to this side from the deep-side recording layer 20B. This layer stray light enters the first photo diode 26A and the second photo diode 26B through the objective lens 23 and the collimator lens 22. In this case, too, the focused light and the layer stray light having the focal distance difference $\Delta f$ enter the first photo diode 26A and the second photo diode 26B.

In this state, the stray light spot, with which the second photo diode 26B is incident, is smaller than the stray light spot, with which the first photo diode 26A is irradiated. Here, the focal distance difference $\Delta f$ is given by the following Formula.

$$\Delta f = 2 \times \left(\frac{f2}{f1}\right)^2 \times d \quad (1)$$

In the spot size detecting method to be used in this optical pickup 7, the first photo diode 26A and the second photo diode 26B are arranged at the positions which are equally spaced by a distance ±X ahead and behind the focal plane A of the focused light. When the spot sizes of the signal lights on those two photo diodes become identical, the optical beam is focused on the recording layer. Since the layer stray light is a reflected light defocused on the disk, however, the spot sizes of the layer stray lights on the two photo diodes are not identical even in the state where the optical beam is focused on the recording layer. The spot radius R of the spot of the layer stray light is given by the following formula, if the advancing direction of the reflected light beam is taken in plus "+".

$$R \approx \left| \frac{X - \Delta f}{f2 + \Delta f} \times 2 \times f1 \times NA \right| \quad (2)$$

From the result of Formula (1), moreover, the following formula is obtained, when the optical beam is focused on the shallow-side recording layer 20A (FIG. 4A).

$$R \approx \left| \frac{X - 2\eta^2 d/n}{f2 + 2\eta^2 d/n} \times 2 \times f1 \times NA \right| \quad (3)$$

The following formula is obtained, when the optical beam is focused on the deep-side recording layer 20B (FIG. 4B).

$$R \approx \left| \frac{X + 2\eta^2 d/n}{f2 - 2\eta^2 d/n} \times 2 \times f1 \times NA \right| \quad (4)$$

Here, letter n designates the refractive index of the substrate of the optical disk 20, and letter $\eta$ is given by the following formula.

$$\eta = \frac{f2}{f1} \quad (5)$$

Thus, the size relation between the stray light spot diameter on the first photo diode 26A and the stray light spot diameter on the second photo diode 26B is reversed in dependence upon which of the shallow-side recording layer 20A and the deep-side recording layer 20B the optical beam is focused on.

Figure 5A:
FIGS. 5A to 5C present schematic diagrams showing various spot shapes.
Figure 5B:
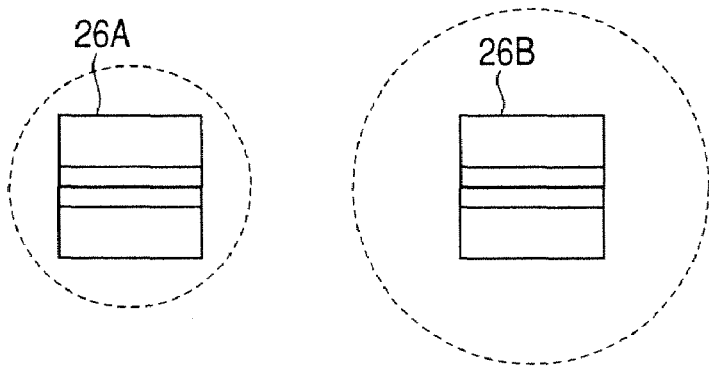
Figure 5C:
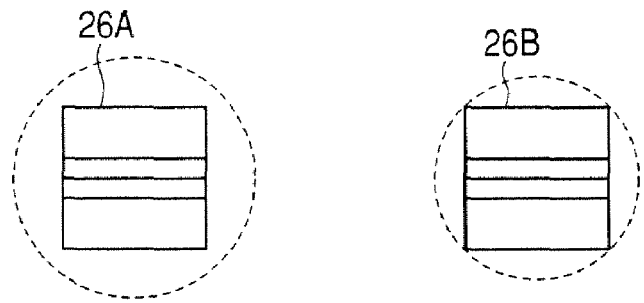

Examples of the spot shapes of the signal light and the layer stray light in the focused state are shown in FIGS. 5A to 5C. FIG. 5A shows the stray light spot (or the focused optical spot) in the focused state, and the spot diameter on the first photo diode 26A and the spot diameter on the second photo diode 26B are substantially equal. This is identical between the case, in which the optical beam is focused on the shallow-side recording layer 20A, and the case, in which the optical beam is focused on the deep-side recording layer 20B.

Therefore, the quantities of the signal lights, which are received in the focused state by the first photo diode 26A and the second photo diode 26B, are substantially constant irrespective of the focused recording layers.

On the other hand, FIG. 5B shows the stray light spots in the state where the optical beams are focused on the shallow-side recording layer 20A. In this state, the spot diameter on the second photo diode 26B is larger than that on the first photo diode 26A.

On the other hand, FIG. 5C shows the stray light spots in the state where the optical beams are focused on the deep-side recording layer 20B. In this state, the spot diameter on the second photo diode 26B is smaller than that on the first photo diode 26A.

The sizes of the stray light spots of either case are larger than the light receiving surfaces of the first photo diode 26A and the second photo diode 26B so that the quantities of the stray lights received by the first photo diode 26A and the second photo diode 26B are the smaller for the larger spot diameter of the stray light spot and the larger for the smaller spot diameter of the stray light spot.

Since the output signals of the photo diodes vary with the quantities of the received lights, moreover, the recording layer, on which the optical beams are focused, can be discriminated on the basis of the signal levels of an OR signal C1 (C1=A+B+C+D) of the first photo diode 26A and an OR signal C2 (C2=E+H+G+H) of the second photo diode 26B.

Here, the OR signals C1 and C2 contain the quantities of the signal lights and the quantities of the stray lights individually. If, moreover, the quantity of the signal light to enter the first photo diode 26A and the quantity of the signal light to enter the second photo diode 26B are completely equal, the focal layer can be simply discriminated on the basis of the level relation between the signal levels of the OR signal C1 and the OR signal C2.

However, the optical pickup 7 is designed such that the quantity of the signal light to enter the first photo diode 26A and the quantity of the signal light to enter the second photo diode 26B may be equal. However, the quantities of the lights to enter the two photo diodes may be different due to the causes of dispersions of the reflectivity (i.e., ideally, 50% of reflection and 50% of transmission) of the second reflecting surface 25B of the micro prism 25. In this case, the focal layer may be unable to be discriminated merely by examining the level relation of the OR signal C1 and the OR signal C2.

In order to solve this problem, the signal level ratio (as will be called the "OR signal ratio") between the OR signal C1 and the OR signal C2 in the state where only the signal light comes in (i.e., when the single-layer optical disk is used) is acquired in advance, and the focused layer discrimination may be made on the basis of the level relation between that reference value and the OR signal ratio calculated at the time of discriminating the focal layer.

Figure 6C:
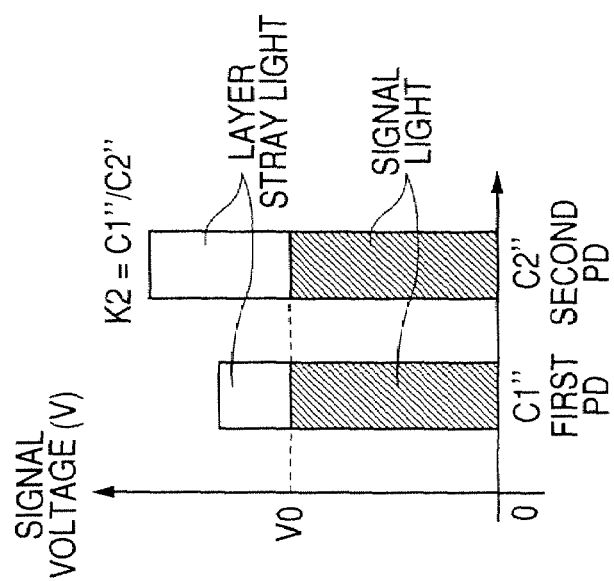
FIGS. 6A to 6C present graphs showing signal light levels and stray light levels.
Figure 6B:
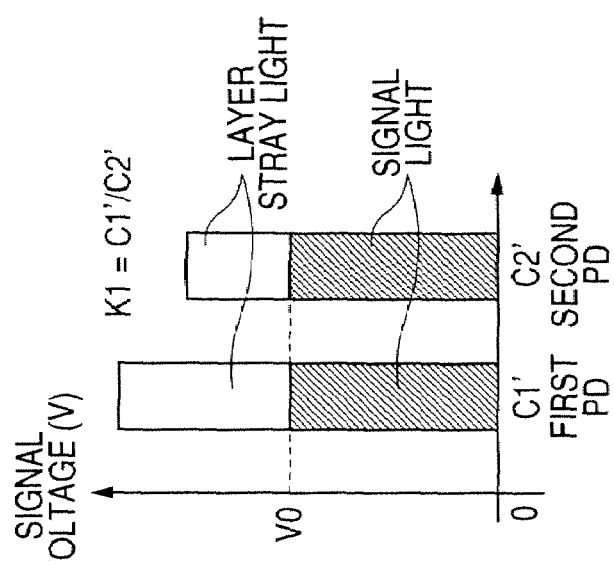
Figure 6A:
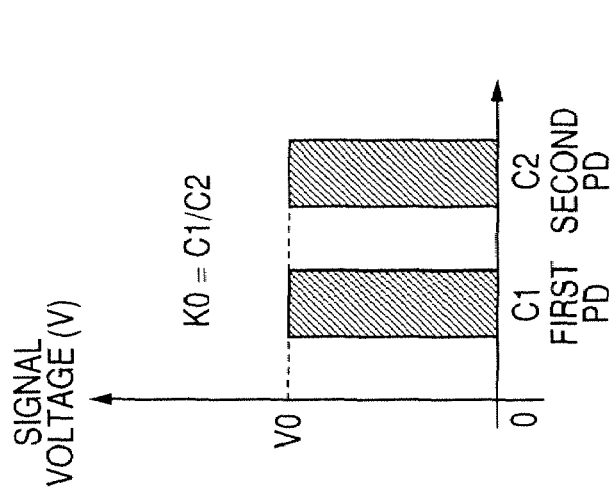

FIG. 6A shows the signal levels of the OR signal C1 of the first photo diode 26A and the OR signal C2 of the second photo diode 26B in the focused state for only the signal light spot (i.e., at the time of using the single-layer optical disk). The OR signal ratio of the OR signal C1 and the OR signal C2 in this state is designated by K0 (K0=C1/C2). This OR signal ratio K0 is measured before the optical disk device 1 and stored in the nonvolatile memory (although not shown) of the microcomputer 2.

On the other hand, FIG. 6B shows the signal levels of the OR signal C1' of the first photo diode 26A and the OR signal C2' of the second photo diode 26B in the state where the shallow-side recording layer 20A of the two-layer optical disk is focused. In this state, the stray light spot diameter on the first photo diode 26A is smaller than the stray light spot diameter on the second photo diode 26B, so that the quantity of the stray light to enter the first photo diode 26A is larger than that of the stray light to enter the second photo diode 26B. The OR signal ratio of the sum signal C1 and the OR signal C2' in this state is designated by a reference OR signal ratio K1 (K1=C1'/C2').

On the other hand, FIG. 6C shows the signal levels of the OR signal C1' of the first photo diode 26A and the OR signal C2'' of the second photo diode 26B in the state where the deep-side recording layer 20B of the two-layer optical disk is focused. In this state, the stray light spot diameter on the first photo diode 26A is larger than the stray light spot diameter on the second photo diode 26B, so that the quantity of the stray light to enter the first photo diode 26A is smaller than that of the stray light to enter the second photo diode 26B. The OR signal ratio of the sum signal C1 and the OR signal C2' in this state is designated by K2 (K2=C1''/C2'').

The relations among those OR signal ratios K0, K1 and K2 of three kinds are K2<K0<K1. It is, therefore, possible to decide that the focus is made on the shallow-side recording layer in case the OR signal ratio K calculated at the focused layer discriminating time is larger than the reference OR signal ratio K0, and that the focus is made on the deep-side recording layer in case the OR signal ratio K is smaller than the reference OR signal ratio K0.

This focused layer discriminating operation, as based on the OR signals C1 and C2, is described again on the basis of the block diagram of FIG. 1. Specifically, a first OR signal amplifier 11 of the RF amplifier 9 generates the OR signal C1 by adding the light receiving signals A to D fed from the first photo diode 26A of the optical pickup 7, and feeds the OR signal C1 to the A/D converter 15 of the DSP 3. Likewise, a second OR signal amplifier 12 of the RF amplifier 9 generates the OR signal C2 by adding the light receiving signals E to H fed from the second photo diode 26B of the optical pickup 7, and feeds the OR signal C2 to the A/D converter 15 of the DSP 3. This A/D converter 15 converts the OR signals C1 and C2 into digital signals, and feeds the digital signals to the microcomputer 2.

Moreover, the microcomputer acting as a focused recording layer discriminating unit calculates the OR signal ratio K by using the OR signals C1 and C2 fed from the A/D converter 15, and discriminates the focused layer on the basis of the result of the comparison between the OR signal ratio K and the reference OR signal ratio K0 stored in the nonvolatile memory. According to the focused layer discriminated, moreover, the microcomputer 2 performs the corrections of the laser output optimum for the focused layer, the tracking coefficient, the spherical aberration corrections and so on.

(3) Focused Layer Deciding Operations

The various processing procedures for deciding the aforementioned focused layer are described in detail in the following with reference to flow charts.

(3-1) Reference OR Signal Ratio Setting Procedure

The processing procedure for setting the reference OR signal ratio K0 is described at first. This processing may be executed either as an initial setting before the optical disk device 1 is shipped from the factory, for example, or at each time when the single-layer optical disk is set in the optical disk device 1.

Figure 7:
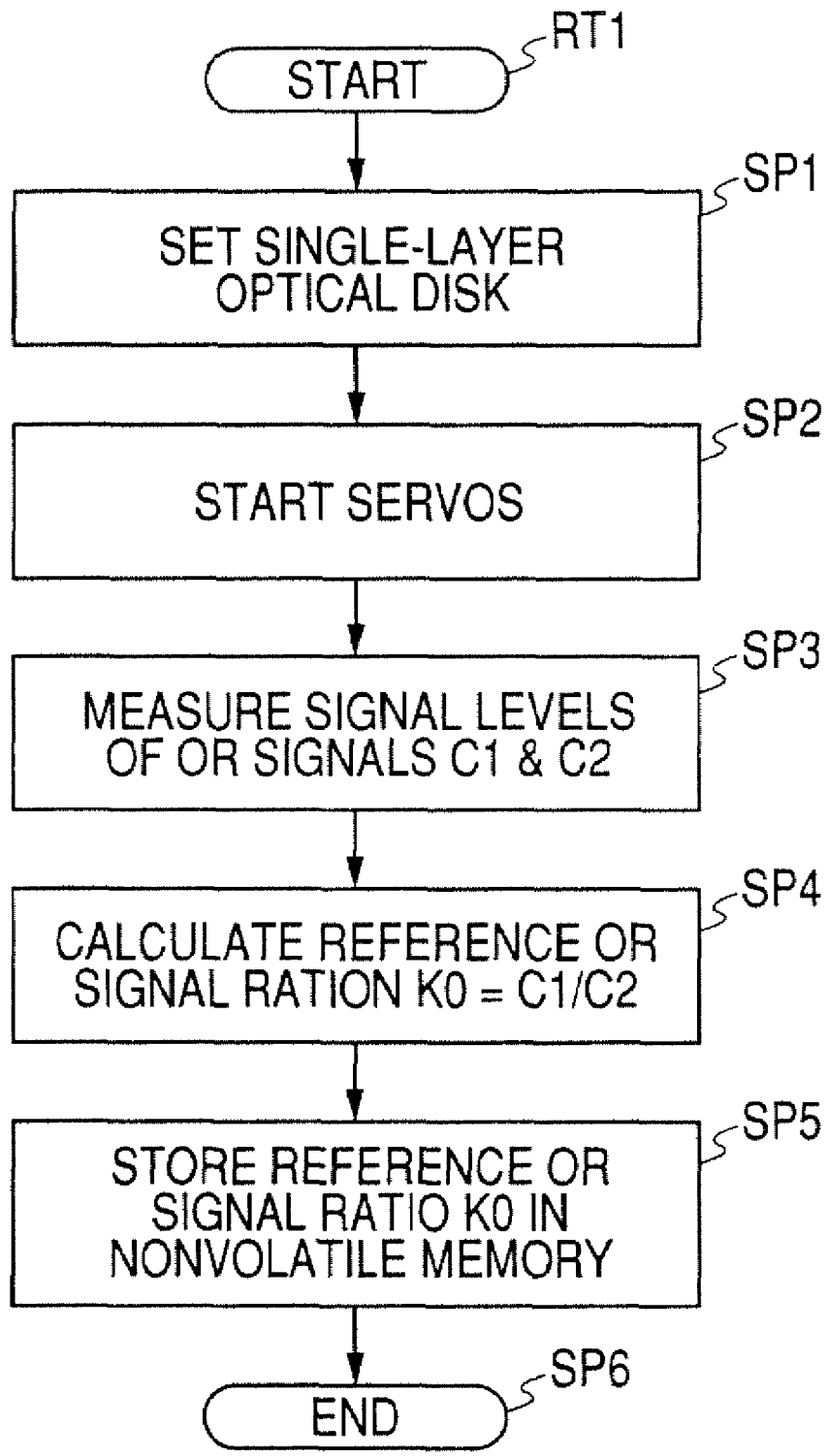
FIG. 7 is a flow chart of a reference OR signal ratio setting procedure.

The microcomputer 2 of the optical disk device 1 enters the starting step of a reference OR signal setting operation RT1, as shown in FIG. 7, and advances to Step SP1. If it is detected that the single-layer optical disk is set as a reference disk, the procedure advances to next Step SP2, at which the focus servo and the tracking servo of the optical pickup 7 are started.

At next Step SP3, the microcomputer 2 controls the optical pickup 7 to irradiate the single-layer optical disk with the optical beam, and acquires the OR signals C1 and C2, as based on the reflected light, from the DSP 3. The microcomputer 2 measures the signal levels of the OR signals C1 and C2, and advances to next Step SP4. At this Step SP4, the microcomputer 2 calculates the reference OR signal ratio K0, and advances to next Step SP5.

At Step SP5, moreover, the microcomputer 2 stores the calculated reference OR signal ratio K0 in the nonvolatile memory, and advances to next Step SP6, at which the microcomputer 2 ends the reference OR signal setting procedure.

(3-2) Focused Layer Detection at Focus Jumping Time

Here is described the processing at the time when the focused layer is discriminated after the focus jump, in which the focus of the optical beam is moved from a recording layer being accessed to, to another recording layer while the two-layer optical disk is being used.

Figure 8:
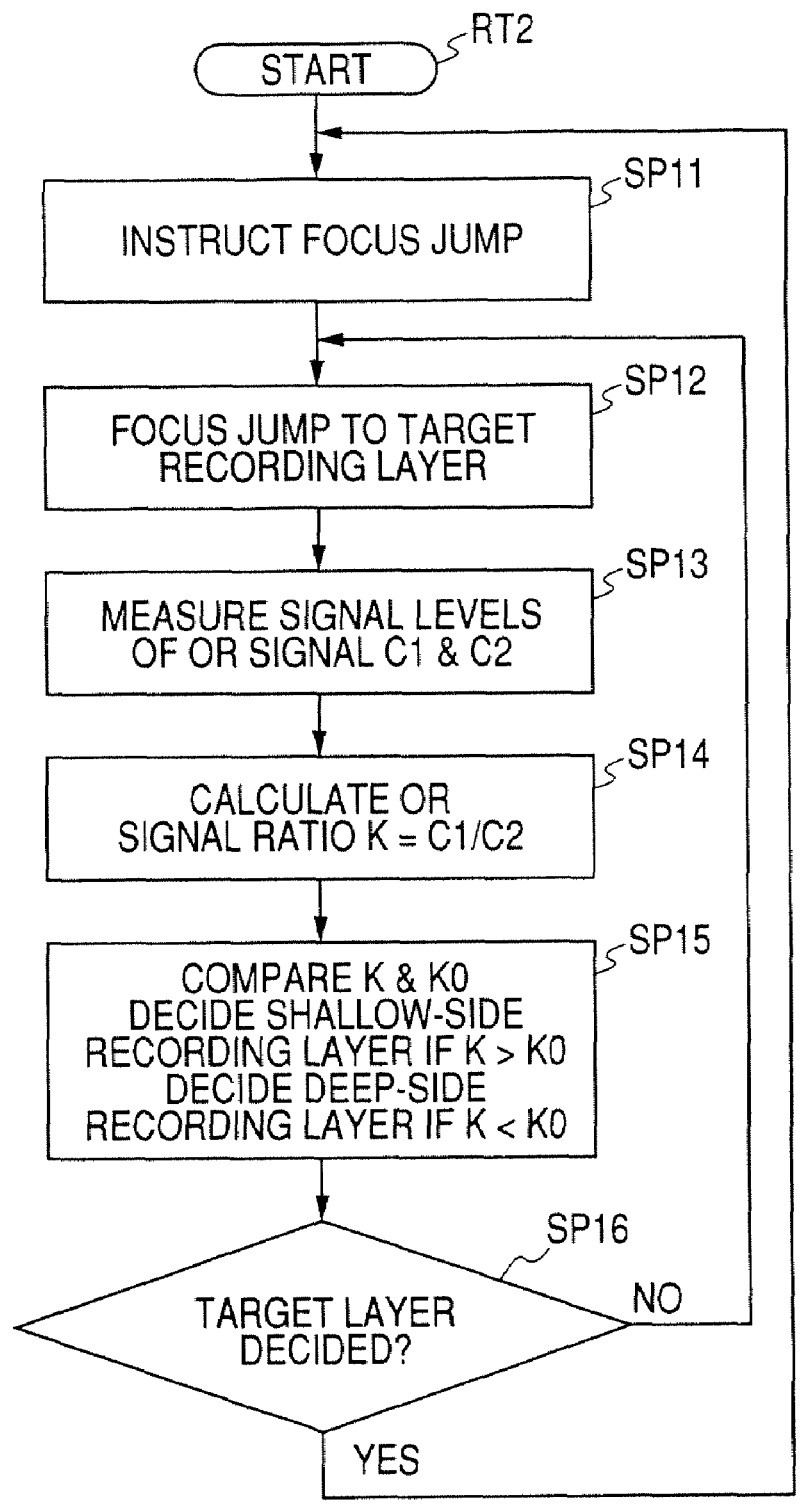
FIG. 8 is a flow chart of a focus jumping procedure.

The microcomputer 2 of the optical disk drive 1 enters, when it detects that the two-layer optical disk has been set, the starting step of a focus jumping procedure RT2 shown in FIG. 8, and advances to Step SP11, at which it awaits the focus jumping instruction from a reproduction program or the like. The microcomputer 2 advances, when it accepts the focus jumping instruction, to next Step SP12.

At Step SP12, the microcomputer 2 controls the biaxial actuator 23A of the optical pickup 7 through the DSP 3, and moves the focus of the optical beam to the target recording layer designated by the focus jumping instruction. The microcomputer 2 then advances to next Step SP13.

At Step SP13, the microcomputer 2 acquires the OR signals C1 and C2 in the destination recording layer from the DSP 3, and measures the signal levels of the OR signals C1 and C2. The microcomputer 2 advances to Step SP14, at which it calculates the OR signal ratio K on the basis of the signal levels of the OR signals C1 and C2, and advances to next Step SP15.

At Step SP15, the microcomputer 2 compares the OR signal ratio K calculated and the reference OR signal ratio K0 stored in the nonvolatile memory, and decides that the shallow-side recording layer is focused, in case the calculated OR signal ratio K is larger than the reference OR signal ratio K0, and that the deep-side recording layer is focused, in case the calculated OR signal ratio K is smaller than the reference OR signal ratio K0. Then, the microcomputer 2 advances to next Step SP16.

At Step SP16, the microcomputer 2 decides whether or not the focused recording layer decided at Step SP15 is identical to the target recording layer designated by the focus jumping instruction. In case the answer YES is attained at Step SP16, it is meant that the focus jump has succeeded so that the focus has moved to the target recording layer. At this time, the microcomputer 2 returns to Step SP11, at which it awaits a new focus jumping instruction.

In case the answer NO is attained at Step SP16, on the contrary, it is meant that the focus jump has failed so that the focus has not moved to the target recording layer, and the microcomputer 2 then returns to Step SP12, at which it executes the focus jump again.

(3-3) Detection of Focused Layer at Servo Recovery Time

Here is described the processing at the time when the focused layer is discriminated after the recovery, in which the servo recovery is made after the focus servo failed, while the two-layer optical disk is being used.

The microcomputer 2 of the optical disk drive 1 enters, when it detects that the two-layer optical disk has been set, the starting step of a servo recovering procedure shown in FIG. 9, and advances to Step SP21, at which it awaits the notification of focus servo failure from the servo control circuit 4. The microcomputer 2 advances to next Step SP22 when it accepts that notification.

At Step SP22, the microcomputer 2 controls the biaxial actuator 23A of the optical pickup 7 through the DSP3, and moves the focus of the optical beam to the focused recording layer at the instant before the focus servo fails. The microcomputer 2 then advances to next Step SP23.

At Step SP23, the microcomputer 2 acquires the OR signals C1 and C2 in the destination recording layer from the DSP 3, and measures the signal levels of the OR signals C1 and C2. The microcomputer 2 advances to Step SP24, at which it calculates the OR signal ratio K on the basis of the signal levels of the OR signals C1 and C2, and advances to next Step SP25.

At Step SP25, the microcomputer 2 compares the OR signal ratio K calculated and the reference OR signal ratio K0 stored in the nonvolatile memory, and decides that the shallow-side recording layer is focused, in case the calculated OR signal ratio K is larger than the reference OR signal ratio K0, and that the deep-side recording layer is focused, in case the calculated OR signal ratio K is smaller than the reference OR signal ratio K0. Then, the microcomputer 2 advances to next Step SP26.

At Step SP26, the microcomputer 2 decides whether or not the focused recording layer decided at Step SP25 is identical to the focused recording layer at the instant before the focus servo fails. In case the answer YES is attained at Step SP26, it is meant that the servo recovery has succeeded so that the focus has returned to the original recording layer. At this time, the microcomputer 2 returns to Step SP21, at which it awaits a new focus failure instruction.

In case the answer NO is attained at Step SP26, on the contrary, it is meant that the servo recovery has failed so that the focus has not returned to the source recording layer, and the microcomputer 2 then returns to Step SP22, at which it executes the servo recovery again.

(4) Operations and Effects

In the optical disk device 1 thus constituted, the reflected optical beam is received by the first photo diode 26A and the second photo diode 26B, which are disposed at the positions equally spaced ahead and behind from the focal point of the reflected optical beam, thereby to generate the reproduced signal and the focus error signal based on the spot size detecting method. At the same time, the focused layer is discriminated by using the signal levels of the OR signal C1 of the outputs of the first photo diode 26A and the OR signal C2 of the outputs of the second photo diode 26B, on the basis of the size relation between the stray light spots, with which the first photo diode 26A and the second photo diode 26B are individually irradiated.

Therefore, the optical disk device 1 can discriminate the focused layer at the instant of completion of the focus servo pull-in, in which the optical beam is focused on the recording layer, so that it can perform the focused layer discrimination more quickly than the optical disk device of the related art, in which the focused layer is discriminated on the basis of the address information of the recorded data after the focus servo pull-in, thereby to speed up the operations of the servo recovery after the focus servo failure, the focus jump and so on.

In this optical disk device 1, moreover, the reference OR signal ratio K0 or the signal level ratio of the OR signal C1 and the OR signal C2 measured by the single-layer optical disk forming no stray light is acquired in advance, and the focused layer is discriminated on the basis of the level relation between the reference OR signal ratio K0 and the OR signal ratio K or the signal level ratio of the OR signal C1 and the OR signal C2 measured by the two-layer optical disk or the focused layer discrimination target. As a result, the influences of the quantity difference of the focused lights to enter the first photo diode 26A and the second photo diode 26B can be eliminated to discriminate the focused layer more precisely.

In this optical disk device 1, still moreover, the focused layer can be discriminated by using the output signals of the first photo diode 26A and the second photo diode 26B of the optical pickup 7 for generating the focus error signal by the side spot detecting method, so that the focused layer can be discriminated with the simple constitution but without providing means for discriminating the focused layer, separately.

(5) Another Embodiment

In the aforementioned embodiment, the focused layer is discriminated on the basis of the OR signal ratio K. However, the invention should not be limited to that embodiment but can detect the interlayer thickness d of the two-layer optical disk on the basis of the OR signal ratio K. Specifically, the stray light spot diameter R, as given by Formula (3) and Formula (4), depends upon the interlayer thickness d. Therefore, if the reference OR signal ratio K0 is acquired by the reference disk having the known interlayer thickness d0, an unknown interlayer thickness dx can be calculated from an OR signal ratio Kx, as calculated by the two-layer optical disk having that interlayer thickness dx, and the reference OR signal ratio K0.

This means that the interlayer thickness d can be discriminated at the instant when the focus servo is applied to plural kinds of two-layer optical disks having individually different interlayer thicknesses d. If optical parameters such as the spherical aberrations of the optical pickup 7 are corrected by using the interlayer thicknesses d discriminated, the starting speed after the optical disk was set can be improved better than the related art.

The invention can be applied to the optical disk device matching two-layer optical disks.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk device comprising:
   an objective lens for focusing an optical beam on a recording layer of an optical disk;
   a converging lens for converging the reflected optical beam reflected on the recording layer;
   first and second light receiving units disposed at positions spaced ahead and behind at equal distances from the focal point of the reflected optical beam converged by the converging lens; and
   a focused recording layer discriminating unit for deciding, on the basis of the output signal of the first light receiving unit and the output signal of the second light receiving unit, the positional relation in a two-layer optical disk between a focused recording layer, on which the optical beam is focused, and a defocused recording layer, on which the optical beam is not focused, thereby to discriminate the focused recording layer on the basis of the decision result.

2. An optical disk device according to claim 1,
   wherein the focused recording layer discriminating unit recognizes, on the basis of the comparison between the signal level ratio between the output signal of the first light receiving unit and the output signal of the second light receiving unit as calculated by using a reference single-layer optical disk, and the signal level ratio between the output signal of the first light receiving unit and the output signal of the second light receiving unit as calculated by using a two-layer optical disk whose focused layer is to be discriminated, the relation between the light quantities, in which a stray light produced from the optical beam reflected on the defocused recording layer enters the first and second light receiving units, thereby to discriminate the focused recording layer on the basis of the light quantity relation recognized.

3. A method for discriminating the focused layer of an optical disk, comprising the steps of:
   calculating a signal level ratio of the output signals of first and second light receiving means which are disposed at positions spaced ahead and behind at equal distances from the focal point of a reflected optical beam which is produced from a converged optical beam reflected on the recording layer of an optical disk; and
   discriminating a focused recording layer by deciding, on the basis of the output signal level ratio calculated, the positional relation in a two-layer optical disc between a focused recording layer, on which the optical beam is focused, and a defocused layer, on which the optical beam is not focused, and discriminating the focused recording layer on the basis of the decision result.

* * * * *